Patented June 25, 1935

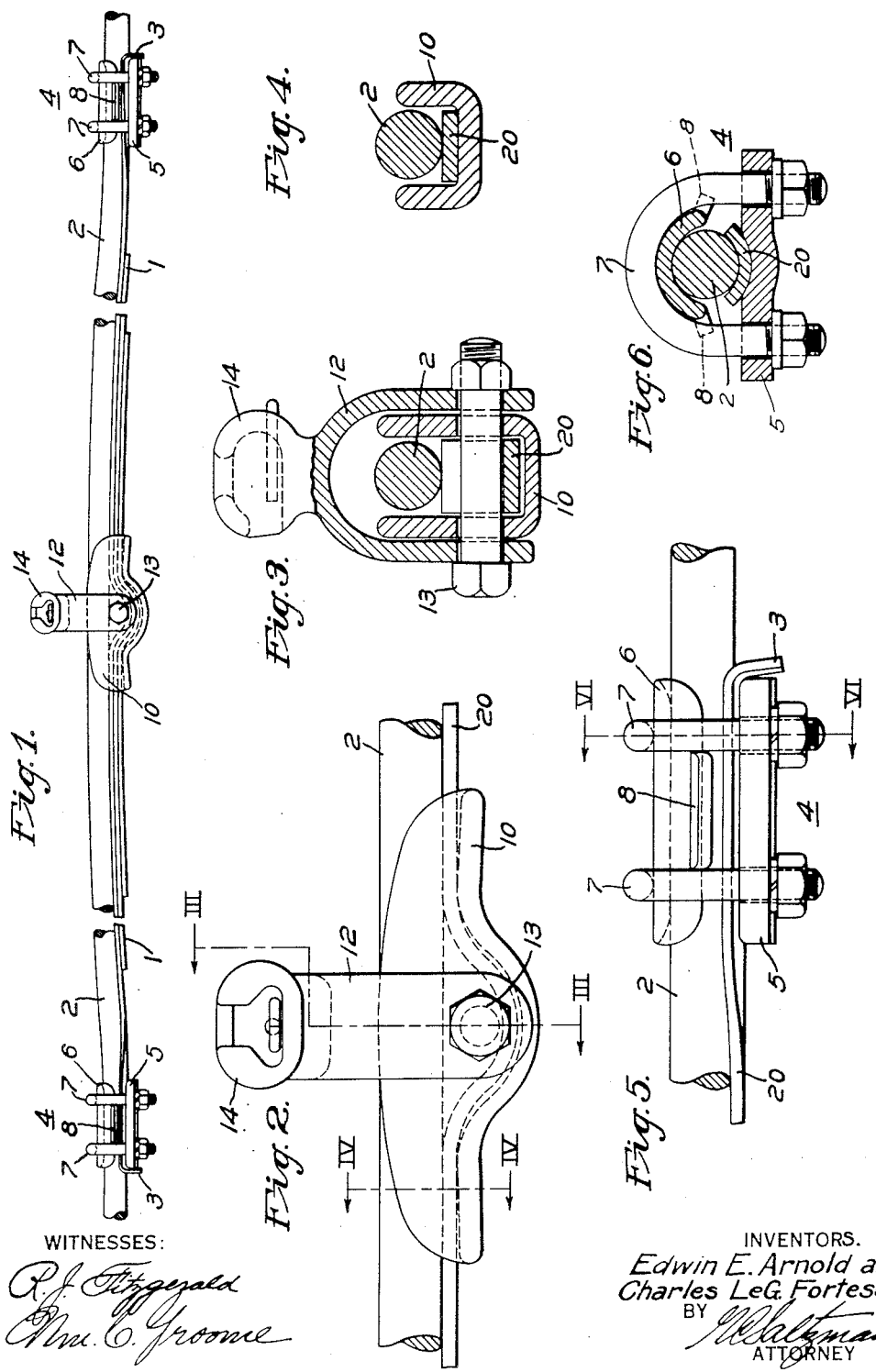

2,005,881

UNITED STATES PATENT OFFICE 2,005,881

TRANSMISSION LINE CLAMP

Edwin E. Arnold and Charles Le G. Fortescue, Pittsburgh, Pa., assignors to Westinghouse Electric & Manufacturing Company, East Pittsburgh, Pa., a corporation of Pennsylvania Application May 24, 1933, Serial No. 672,662

3 Claims. (Cl. 248—63)

Our invention relates to clamps for securing transmission line cables to supporting towers, and more particularly to a clamp of improved design wherein molecular fatigue of the conductor adjacent to the clamp, resulting from vibration of the cable, is substantially eliminated.

In the past much thought has been given to the prevention of transmission line breakage, and the consequent reduction in line outages and strain or damage to the supporting towers and various types of clamps have been proposed for reducing or attempting to eliminate these difficulties. In substantially all cases, however, there has been a more or less rigid connection between the cable and the supporting structure through the clamp, so that cable vibrations reacting against the clamp resulted in bending of the cable at the point of clamping. Inevitable molecular fatigue and consequent breakage resulted.

Cable vibrations which cause a horizontal movement or swing of the cable are not particularly harmful, because the cable and clamp are free to swing together about the point of support of the insulator string. It is necessary, therefore, only to guard against vibrations causing vertical movement of the cable, which movements cause a bending of the cable at the point of clamping because vertical movement of the clamp is restricted.

It is an object of the present invention to provide a simple and inexpensive clamp which provides a resilient connection between the cable and the supporting structure to prevent the damaging effect of line vibration on the cable.

In practicing the invention, an elongated spring of flexible strip material underlies the conductor for a substantial part of the length thereof and the ends of the spring are firmly clamped to the conductor. A supporting shoe underlies the strip at substantially the mid point thereof and is pivotally secured to a yoke, which in turn is secured to the cross arm of the transmission line tower, or other supporting structure, by means of a string of suspension insulators.

In the drawing, Figure 1 is a view in elevation of one modification of the clamp constituting the present invention;

Fig. 2 is an enlarged view in elevation of the central supporting structure, corresponding to that shown in Fig. 1, of another modification of the invention;

Fig. 3 is a view in lateral section taken on the line III—III in Fig. 2;

Fig. 4 is a view in lateral section taken on the line IV—IV in Fig. 2;

Fig. 5 is a view in elevation of a portion of the structure shown in Fig. 1; and Fig. 6 is a view in lateral section taken on the line VI—VI in Fig. 5.

Referring more specifically to the drawing and particularly Fig. 1 thereof, a multi-leaf spring 1 of flexible strip material, such as spring steel, is adapted to underlie the cable 2 for a substantial distance. As shown, the spring is composed of three leaves of different length, although quite obviously the number and dimensions of the leaves, as well as the material of which they are made, may be varied to meet the requirements of a given installation.

The end portions of the longest leaf of the spring 1 are formed to approximately conform to the contour of the cable 2, and are provided with lateral extensions 3 extending at right angles to the axis of the cable.

The mid-portions of the leaves of the spring 1 are bent or deformed and serve the double purpose of imparting a limited longitudinal resiliency to the spring, and of maintaining the spring in proper position with reference to the supporting structure, as hereinafter described. It is contemplated that the spring shall be of substantial length, of the order of several feet, so that the ends will be a substantial distance from the point of support.

The ends of the spring 1 are secured to the cable by means of clamps 4, each comprising a lower shoe 5 and an upper shoe 6 clamped together with U-bolts 7. The longitudinal edges of the upper clamping shoes 6 are provided with lugs 8 to properly position the shoe with reference to the U-bolts 7 and the lateral extensions 3 cooperate with the remote sides of the clamps to insure that the cable, clamp and spring are securely clamped together.

A supporting shoe or saddle 10 is disposed about the mid point of the spring 1 and loosely surrounds the conductor 2. A deformed portion in the saddle 10 cooperates with the bent or deformed portion in the mid-portions of the spring to prevent substantial movement of the shoe longitudinally of the spring, and to maintain the spring and saddle in proper operative relation.

A suporting yoke or stirrup 12 straddles the saddle 10 and is pivoted thereto by means of a bolt 13. The upper part of the stirrup is provided with a socket 14 of a usual type for securing the assembly to a cooperating element at the bottom of a string of insulators, which in turn is secured to the transmission line tower or other support. It will be noted that the bolt 13 extends transversely of the saddle 10 above the bent portion in the spring 1 and beneath the cable 2 to maintain the saddle in proper position with reference to the spring and cable.

In Figs. 2 to 6, inclusive, the construction is the same as that shown in Fig. 1 except that the spring comprises a single strip 20 of flexible material, instead of a plurality of strips as in Fig. 1. Such construction may be considered preferable for many applications, both for engineering and economic reasons. The various parts shown in Figs. 2 to 6 are numbered to correspond with the corresponding parts shown in Fig. 1.

It should be apparent that, with the construction described, vibrations occurring in the line 2 between spans will cause movement at the ends of the strip or spring, but there is no relative movement between the clamps 4 and the cable 2 and there is, accordingly, no bending of the conductor at the point of clamping. In addition, the cable 2 extends freely through the shoe 10 and, since relative movement is permitted, there is no stress imposed upon the cable at the point of support.

In assembling the structure, preferably, the cable is slightly bent before the clamps 4 are applied, so that, when the structure is ultimately raised to its operative position, the stretch of conductor between the clamps is subjected to a compressive force; the strip or spring being so dimensioned and of such material that it can assume safely the strain imposed by the weight of the cable, and constitutes a resilient tie between the clamps.

In view of the fact that the strip or spring is flexible in a vertical plane it is effective to damp or absorb, to some extent, vibrations on the cables; and the widely spaced clamps in conjunction with the longitudinal resiliency of the strip afforded by the bend in the mid-portion thereof, result in a desired stress distribution and stress relief in the cable and supporting structure. By providing a multi-leaf spring, as in Fig. 1, the friction between the leaves tends to damp or absorb the line vibrations, and when a single strip is used, the friction between the strip and the cable resting upon it tends to damp the vibrations.

Inasmuch as it is impossible to completely eliminate the vibration in a transmission line span, a practical solution of the problem of cable breakage due to vibration is the provision of a structure as above described wherein the effect of the vibration is eliminated, or at least substantially reduced.

Quite obviously, various modifications may be made in the invention without departing from the spirit and scope thereof, and it is desired that only such limitations be placed thereon as are imposed by the prior art and set forth in the appended claims.

We claim as our invention:

1. A supporting clamp for a transmission line cable comprising a resilient tie member for disposition longitudinally of the cable and in contact therewith for a substantial portion of its length, means for securing the ends of said tie member to the cable, and means engaging the central portion of said resilient tie member and free of the cable for securing the clamp to a support, said means and resilient tie member having cooperating portions to maintain them in operative relation.

2. A supporting clamp for a transmission line cable comprising a strip of flexible material for disposition beneath the cable longitudinally thereof, clamps for securing the ends of said strip to the cable, a supporting shoe surrounding with said strip adjacent the mid point thereof and loosely surrounding the cable, a supporting element and means for pivotally securing it to said shoe for pivotal movement in a plane parallel with the axis of said cable said securing means including a bolt extending transversely of said shoe below the cable and above said strip for maintaining said shoe and strip in operative relation.

3. A supporting clamp for a cable comprising an elongated strip for disposition beneath the cable substantially parallel therewith, means for clamping the ends of said strip to the cable, a bent portion in said strip at substantially the midpoint thereof, a supporting shoe having a recess therein for receiving said bent portion and being proportioned to loosely surround the cable, and means for pivotally supporting said shoe, including means for maintaining said bent portion in said recess.

EDWIN E. ARNOLD.
CHARLES LE G. FORTESCUE.